(12) United States Patent
Anderson et al.

(10) Patent No.: US 8,255,249 B1
(45) Date of Patent: Aug. 28, 2012

(54) PROJECT EQUIPMENT ALLOCATION PLANNING TOOL

(75) Inventors: William S. Anderson, Independence, MO (US); Drew Arthur, Overland Park, KS (US); Rachael L. Ferrara, Lee's Summit, MO (US); Michael C. Golden, Leawood, KS (US); Edward M. Huels, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1028 days.

(21) Appl. No.: 11/875,291

(22) Filed: Oct. 19, 2007

(51) Int. Cl.
*G06Q 10/00* (2012.01)
(52) U.S. Cl. ............... 705/7.11; 705/7.12; 705/7.23; 705/7.25; 705/7.37
(58) Field of Classification Search .......... 705/1, 5, 705/7, 8, 10, 28, 4, 7.22, 7.23; 702/18; 709/22; 700/171
See application file for complete search history.

(56) References Cited

U.S. PATENT DOCUMENTS

| | | | |
|---|---|---|---|
| 4,924,378 A | 5/1990 | Hershey et al. | |
| 5,742,757 A | 4/1998 | Hamadani et al. | |
| 5,884,037 A * | 3/1999 | Aras et al. | 709/226 |
| 6,901,386 B1 | 5/2005 | Dedrick et al. | |
| 7,139,737 B2 | 11/2006 | Takahashi et al. | |
| 7,330,822 B1 * | 2/2008 | Robson et al. | 705/7.15 |
| 7,499,865 B2 | 3/2009 | Aggarwal et al. | |
| 7,805,335 B2 * | 9/2010 | Wittmer et al. | 705/26.1 |
| 7,831,457 B2 | 11/2010 | Varadarajan et al. | |
| 2001/0013024 A1 | 8/2001 | Takahashi et al. | |
| 2001/0016821 A1 * | 8/2001 | DeBusk et al. | 705/2 |
| 2002/0082808 A1 * | 6/2002 | Saarinen et al. | 702/186 |
| 2002/0087331 A1 * | 7/2002 | Como | 705/1 |
| 2002/0107809 A1 | 8/2002 | Biddle et al. | |
| 2003/0050871 A1 * | 3/2003 | Broughton | 705/28 |
| 2003/0114952 A1 * | 6/2003 | Scott | 700/171 |
| 2003/0149578 A1 * | 8/2003 | Wong | 705/1 |
| 2003/0191795 A1 * | 10/2003 | Bernardin et al. | 709/105 |
| 2004/0260589 A1 | 12/2004 | Varadarajan et al. | |
| 2005/0049973 A1 | 3/2005 | Read et al. | |
| 2005/0253725 A1 * | 11/2005 | Neuwirth et al. | 340/572.8 |

(Continued)

FOREIGN PATENT DOCUMENTS

JP 2003044706 A * 2/2003

(Continued)

OTHER PUBLICATIONS

Kumar, Ashish, Managing Changes in Large Programs AACE International Transactions, 2000.*

(Continued)

*Primary Examiner* — Lynda Jasmin
*Assistant Examiner* — Naima Akida

(57) ABSTRACT

A system for identifying a discrepancy between a quantity of equipment ordered for a project and a quantity of equipment used for the project is provided. The system includes a procurement module, an engineering planning module, and a comparison module, each stored on one or more computer readable media and executed on one or more processors. The procurement module promotes identifying equipment estimated to be needed for the project and creation of a first list of the identified equipment. The engineering planning module promotes creation of a detailed project design for the project and creation of a second list of equipment deployed for the project. The comparison module provides an integration of the procurement module with the engineering planning module and compares the first list with the second list, and creates a report that promotes identifying discrepancies between the first list and the second list.

17 Claims, 3 Drawing Sheets

U.S. PATENT DOCUMENTS

| | | |
|---|---|---|
| 2005/0289072 A1 | 12/2005 | Sabharwal |
| 2006/0131404 A1* | 6/2006 | Dervishian ............... 235/385 |
| 2006/0178953 A1 | 8/2006 | Aggarwal et al. |
| 2006/0287960 A1 | 12/2006 | Marsnik et al. |
| 2007/0005505 A1 | 1/2007 | D'Alo et al. |
| 2007/0118393 A1* | 5/2007 | Rosen et al. .................... 705/1 |
| 2008/0004932 A1* | 1/2008 | Beer et al. ..................... 705/8 |
| 2008/0028218 A1 | 1/2008 | Simon |
| 2009/0222505 A1 | 9/2009 | Pavan et al. |

FOREIGN PATENT DOCUMENTS

| | | | |
|---|---|---|---|
| JP | 2008293207 A | * | 12/2008 |

OTHER PUBLICATIONS

Kumar, Ashish, Managing Changes in Large Programs AACE International Transactions, 2000, p. 71.*

Office Action dated Jun. 14, 2011, U.S. Appl. No. 12/128,366, filed May 28, 2008.

Anderson, William S., et al., Patent Application entitled, "Management of Project Asset Data," filed May 28, 2008, U.S. Appl. No. 12/128,366.

Final Office Action dated Oct. 24, 2011, U.S. Appl. No. 12/128,366, filed May 28, 2008.

* cited by examiner

PROJECT EQUIPMENT ALLOCATION PLANNING TOOL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When a business-related project is undertaken, equipment is sometimes procured to perform tasks associated with the project. For example, computing equipment, such as one or more server computers, might be purchased and deployed for use specifically on a particular project. As used herein, the terms "equipment", "hardware", and the like might refer to such server computers but could also refer to desktop computers, telecommunications switching equipment, or other devices that are dedicated for use on a specific project. The term "project" might refer to an individual project, a family of related projects, or a portion of a multiple portion project.

SUMMARY

According to one embodiment, a system for identifying a discrepancy between a quantity of equipment ordered for a project and a quantity of equipment used for the project is provided. The system includes a procurement module, an engineering planning module, and a comparison module, each stored on one or more computer readable media and executed on one or more processors. The procurement module promotes identifying equipment estimated to be needed for the project and creation of a list of the identified equipment. The engineering planning module promotes creation of a detailed project design for the project and creation of a list of equipment deployed for the project. The comparison module provides an integration of the procurement module with the engineering planning module and compares the list of the identified equipment with the list of the equipment deployed for the project, and creates a report that promotes identifying discrepancies between the list of the identified equipment and the list of equipment deployed for the project.

In another embodiment, a computer-implemented method is provided for identifying a discrepancy between a quantity of equipment ordered for a project and a quantity of equipment used for the project. The method includes creating a preliminary engineering plan for the project, including in the preliminary engineering plan a list of equipment estimated to be needed for the project, and creating a detailed engineering plan for the project. The method further includes including in the detailed engineering plan a list of equipment deployed for the project, where the list of equipment deployed for the project is available through an integration of an engineering planning module with a procurement module. The method further includes comparing the list of equipment estimated to be needed with the list of equipment deployed, and creating a report of a discrepancy between the list of equipment estimated to be needed and the list of equipment deployed.

In another embodiment, a computer-implemented method for promoting resource management is provided. The method includes showing in an engineering planning module information stored in a procurement module and related to newly released and newly purchased equipment. The method further includes using the engineering planning module to identify a plurality of equipment projected to be deployed for a first project and recording the plurality of projected equipment in a first list, using the engineering planning module to identify a plurality of equipment deployed for the first project and recording the plurality of deployed equipment in a second list, and releasing for use on a second project equipment on the first list that is not on the second list.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
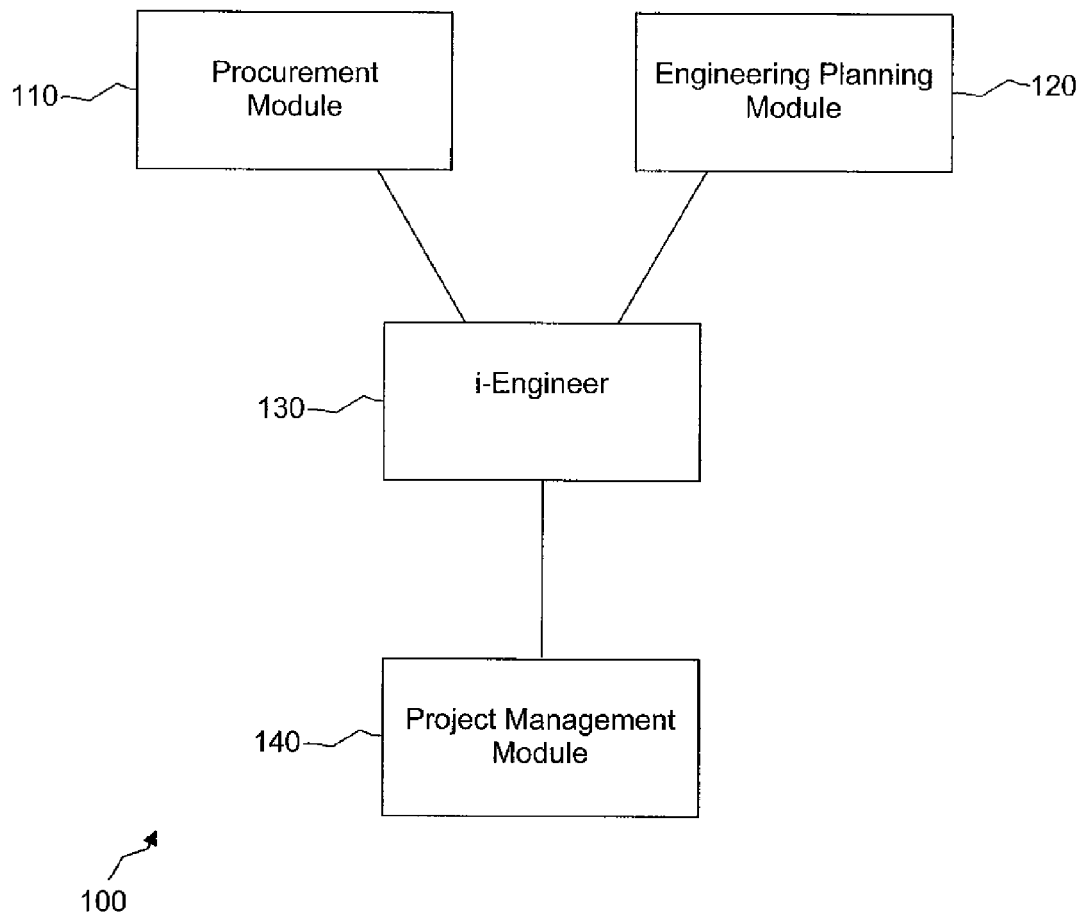
FIG. 1 is a block diagram of a system for identifying a discrepancy between a quantity of equipment ordered for a project and a quantity of equipment actually used for the project according to one embodiment of the present disclosure.

It should be understood at the outset that although an illustrative implementation of one or more embodiments are provided below, the disclosed systems and/or methods may be implemented using any number of techniques, whether currently known or hereafter learned. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the disclosure provide an automated integration of a procurement module and an engineering planning module. The integration allows the procurement module to have access to project planning and design data in the engineering planning module and allows the engineering planning module to have access to inventory-related data in the procurement module. For example, if an engineer is using the engineering planning module to design a project, the integration of the engineering planning module with the procurement module might allow the engineer to retrieve from the procurement module information about the equipment that might be available for the project.

Such an integration might also assist in identifying one or more discrepancies between a quantity of equipment ordered for a project and a quantity of equipment actually used for the project. For example, a preliminary engineering estimate might be made of the equipment likely to be needed for a project, the equipment might be ordered, and a list might be maintained of the ordered equipment. Later, a more detailed engineering assessment might be made of the equipment needed for the project, the equipment might be deployed, and a list might be maintained of the deployed equipment. A report might then be generated comparing the list of ordered equipment with the list of deployed equipment. Discrepancies between the two lists can be noted and can be used to identify equipment that was ordered but not used.

A large enterprise might have several different individuals, groups, or departments that perform different functions in the planning and execution of project-related tasks. For example, a first group might perform a procurement function in which a preliminary estimate is made of the types and quantities of equipment that are expected to be needed for a project. The equipment specified in this preliminary estimate might then be purchased. At a later time, a different group might perform an engineering planning function in which a more definitive specification of the equipment needed for the project is made and in which the equipment might be deployed.

In some cases, the quantity of equipment purchased based on the procurement phase estimate might not match the quantity of equipment actually deployed in the engineering phase. When the quantity actually used is less than the quantity purchased, unused equipment can remain at the end of a project. Several undesirable outcomes may occur with regard to this unused equipment. For example, individuals or groups that might be able to make use of the unused equipment might be unaware that the unused equipment exists, and the unused equipment might remain unused. This can lead to a waste of the funds used to procure the unused equipment. In another example, the individual or group responsible for the equipment that was actually deployed might use the unused equipment in projects for which the unused equipment was not intended to be used. This can cause discrepancies in properly assigning costs to projects.

FIG. 1 illustrates an embodiment of a system 100 that may prevent such undesirable outcomes for equipment that remains unused at the end of a project. The system 100 includes a procurement module 110 that can promote functions related to procuring equipment and an engineering planning module 120 that can promote functions related to deploying equipment. The system 100 also includes a comparison module 130, that can be referred to as an i-Engineer, which can receive information from the procurement module 110 and the engineering planning module 120 and use the information to track and report on unused equipment. In an embodiment, a project management module 140 might also be present and might maintain project-related information that can be used by the comparison module 130. While the comparison module 130 is shown as a standalone module separate from the procurement module 110, the engineering planning module 120, and the project management module 140, the comparison module 130 might include or be included in portions of those modules.

The procurement module 110 might be a data store, a set of policies and procedures, and/or a set of computer instructions for implementing a set of policies and procedures, or might be some other entity similar to any combination of these entities or similar entities. The procurement module 110 can be used to manage the workflow for the procurement of equipment for a project. For example, steps carried out in the procurement module 110 might include creating a preliminary assessment of the equipment likely to be needed for a project, creating a list of the proposed equipment, entering the list in an automated system for equipment procurement and/or project management, and placing an order for the proposed equipment.

The engineering planning module 120 might likewise be a data store, a set of policies and procedures, and/or a set of computer instructions for implementing a set of policies and procedures, or might be some other entity similar to any combination of these entities or similar entities. The engineering planning module 120 can be used to manage the creation of a detailed design for the project, the specification of the equipment that will actually be used in the project, the deployment of the equipment, and similar planning and engineering tasks. A list of the equipment actually used in the project might be created and stored in a database or similar data store.

In an embodiment, the previously independent capabilities of the procurement module 110 and the engineering planning module 120 are integrated via the comparison module 130. For example, an engineer using the engineering planning module 120 to design a project might gain access, via the comparison module 130, to data in the procurement module 110. The procurement module data might show, for instance, the equipment that is available and is designated for use on the project and the equipment that is available but is not designated for use on the project.

In an embodiment, the comparison module 130 can also compare the list of the proposed equipment that was generated by the procurement module 110 with the list of the actually used equipment that was generated by the engineering planning module 120. The comparison module 130 can then create a report that indicates whether any discrepancies exist between the list of proposed equipment and the list of actually used equipment. Equipment on the proposed equipment list but not on the actually used equipment list can be considered unused equipment. A project number or similar identifier might be used to correlate the list of proposed equipment with the list of actually used equipment.

In an embodiment, the project management module 140 can provide additional information that might be used by the comparison module 130. For example, a project status might be listed in the project management module 140 and might be used to indicate when a discrepancy report is to be generated. When a project is closed upon completion, canceled, placed on hold, changed in scope, undergoes some other change in status, or reaches some other milestone, the comparison module 130 might receive notification of the status change from the project management module 140 and generate the discrepancy report at that time. The comparison module 130 might generate the report automatically or might be given a manual instruction to generate the report.

Alternatively or additionally, the project management module 140 might keep track of the date when a piece of equipment was ordered or the time that has elapsed since a piece of equipment was ordered and might provide that information to the comparison module 130. The comparison module 130 might then generate a discrepancy report at regular intervals, such as 30, 60, or 90 days, from the order date to indicate whether any equipment remains uninstalled a significant length of time after it was ordered. In an embodiment, it might be assumed that equipment that has not been installed after some significant length of time will not be used for the project for which it was ordered.

in an embodiment, when a discrepancy report indicates that a piece of equipment is not likely to be used on the project for which it was ordered, either because the equipment remains uninstalled when a project milestone passes or because the equipment has not been installed after a significant length of time has passed, the equipment might be released for reuse on another project. A notification might be sent to one or more individuals or groups that have some responsibility for the project for which the equipment was ordered, informing the individuals or groups that the equipment is about to be released for reuse and providing the individuals or groups an opportunity to prevent the reuse.

Figure 2:
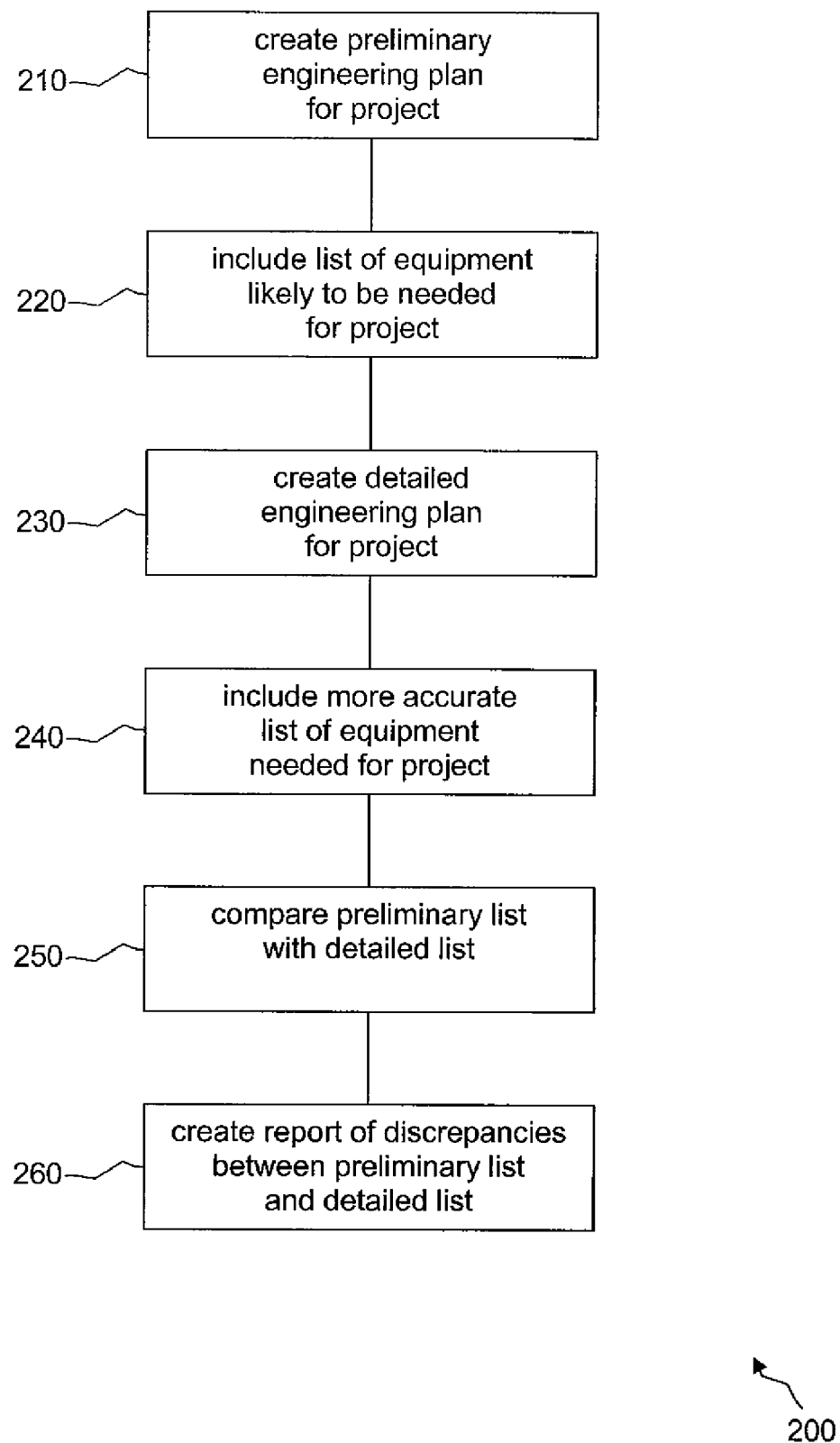
FIG. 2 is a flow chart of a method for identifying a discrepancy between a quantity of equipment ordered for a project and a quantity of equipment actually used for the project according to one embodiment of the present disclosure.

FIG. 2 illustrates a method 200 for identifying discrepancies between a quantity of equipment ordered for a project and a quantity of equipment actually used for the project. In block 210, a preliminary engineering plan for the project is created. In block 220, a list of equipment likely to be needed for the project is included in the preliminary plan. In block 230, a detailed engineering plan for the project is created. In block 240, a more accurate list of equipment needed for the project is included in the detailed plan. Alternatively, this second list might indicate the equipment that was actually deployed for the project. In block 250, a comparison is made between the preliminary list and the detailed list. In block 260, a report is created indicating any discrepancies that exist between the preliminary list and the detailed list. This report might then be used to determine if any equipment that was ordered for the project remains unused and can be redeployed on another project.

While the above discussion has focused on the purchase of new equipment for a project and a comparison between what was purchased and what was actually used, similar considerations could apply to the reuse of existing equipment. That is, an enterprise might have a store of equipment that was purchased but not used, that was taken out of use but can be reused, or that otherwise is available for use on a project for which it was not purchased. In the equipment procurement procedure mentioned above, when the preliminary list of equipment likely to be needed for a project is created, this existing equipment might be designated for use in a project, either instead of or in addition to new equipment that might be purchased for the project. Comparisons could later be made, as described above, between the quantities of this existing equipment and/or any purchased equipment that were proposed for use and the actual quantities of deployed equipment.

Figure 3:
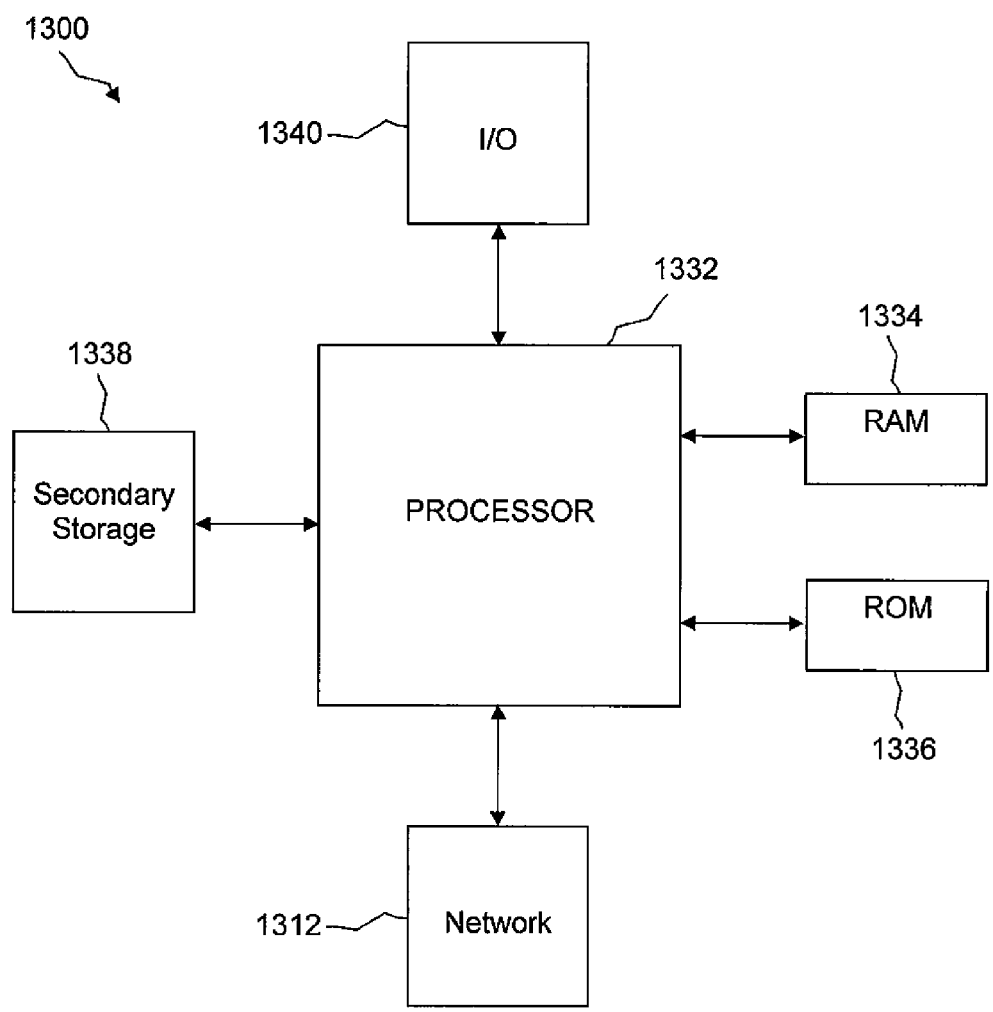
FIG. 3 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332, for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for identifying a discrepancy between a quantity of equipment ordered for a project and a quantity of equipment used for the project, comprising:

a non-transitory computer readable medium comprising instructions of a procurement module that when executed on a processor identifies equipment estimated to be needed for the project, places an order for the identified equipment, and creates a list of the equipment ordered for the project;

a non-transitory computer readable medium comprising instructions of an engineering planning module that when executed on a processor creates a detailed project design for the project and creates a list of equipment deployed for the project, wherein the procurement module and the engineering planning module are independently executed; and a non-transitory computer readable medium comprising instructions of a comparison module that when executed on a processor integrates information from the procurement module with information from the engineering planning module, compares the list of the equipment ordered which was created by the procurement module with the list of the equipment deployed which was created by the engineering planning module, and creates a report that identifies unused equipment based on the comparison;

wherein, when the report indicates that a piece of equipment is on the list of the equipment ordered which was created by the procurement module and is not on the list of equipment deployed which was created by the engineering planning module, the piece of equipment is considered unused equipment; and wherein, when the report indicates that unused equipment exists, the unused equipment is released for another use.

2. The system of claim 1, further comprising a non-transitory computer readable medium comprising instructions of a project management module that when executed on a processor promotes storing information related to status of the project and providing the status to the comparison module to enable the comparison module creating the report upon a change in the status of the project.

3. The system of claim 2, wherein the change in the status of the project is one of a closure of the project upon completion of the project, a cancellation of the project, a placement of the project on hold, and a change in scope of the project.

4. The system of claim 1, wherein the report is created a first pre-specified length of time after an equipment order is placed.

5. The system of claim 4, wherein, when the report indicates that a portion of equipment remains unused a second pre-specified length of time after the equipment order is placed, determining that the portion of equipment will not be used for the project.

6. The system of claim 1, wherein a notification of a planned release of the unused equipment is provided to an entity with responsibility for the project prior to an actual release of the unused equipment.

7. The system of claim 1, wherein the processor executing the procurement module, the processor executing the engineering planning module, and the processor executing the comparison module are the same processor.

8. The system of claim 1, wherein the processor executing the procurement module, the processor executing the engineering planning module, and the processor executing the comparison module are different processors.

9. The system of claim 1, wherein the equipment ordered for the project, the equipment deployed for the project, and the unused equipment, are computing equipment.

10. A computer-implemented method for identifying a discrepancy between a quantity of equipment ordered for a project and a quantity of equipment used for the project, comprising:

creating, by one or more computers, a preliminary engineering plan for the project;

including, by one or more computers, in the preliminary engineering plan a list of equipment estimated to be needed for the project;

ordering, by one or more computers, the equipment estimated to be needed for the project according to the preliminary engineering plan;

maintaining, by one or more computers, a list of the equipment ordered for the project according to the preliminary engineering plan;

creating, by one or more computers, a detailed engineering plan for the project, wherein the detailed engineering plan is created independently of the preliminary engineering plan;

including, by one or more computers, in the detailed engineering plan a list of equipment deployed for the project;

comparing, by one or more computers, the list of equipment ordered for the project according to the preliminary engineering plan with the list of equipment deployed for the project according to the detailed engineering plan;

creating, by one or more computers, a report of unused equipment based on the comparison between the list of equipment ordered for the project according to the preliminary engineering plan and the list of equipment deployed for the project according to the detailed engineering plan; and releasing, by one or more computers, the unused equipment for reuse on another project when the unused equipment remains uninstalled after a project milestone passes or after a pre-specified length of time passes.

11. The method of claim 10, further comprising, when the report indicates that a piece of equipment is on the list of equipment ordered for the project and is not on the list of equipment deployed for the project, considering the piece of equipment to be unused equipment.

12. The method of claim 10, further comprising creating the report upon a change in a status of the project.

13. The method of claim 12, wherein the change in the status of the project is one of closing the project upon completion of the project, cancelling the project, placing the project on hold, and changing scope of the project.

14. The method of claim 10, further comprising creating the report a first pre-specified length of time after placing an equipment order.

15. The method of claim 14, further comprising, when the report indicates that a portion of equipment remains unused a second pre-specified length of time after the equipment order is placed, determining that the portion of equipment will not be used for the project.

16. The method of claim 11, further comprising providing a notification of a planned release of the unused equipment to an entity with responsibility for the project prior to releasing the unused equipment.

17. The method of claim 10, wherein the project is an information technology project.

* * * * *